United States Patent Office 2,837,662
Patented June 3, 1958

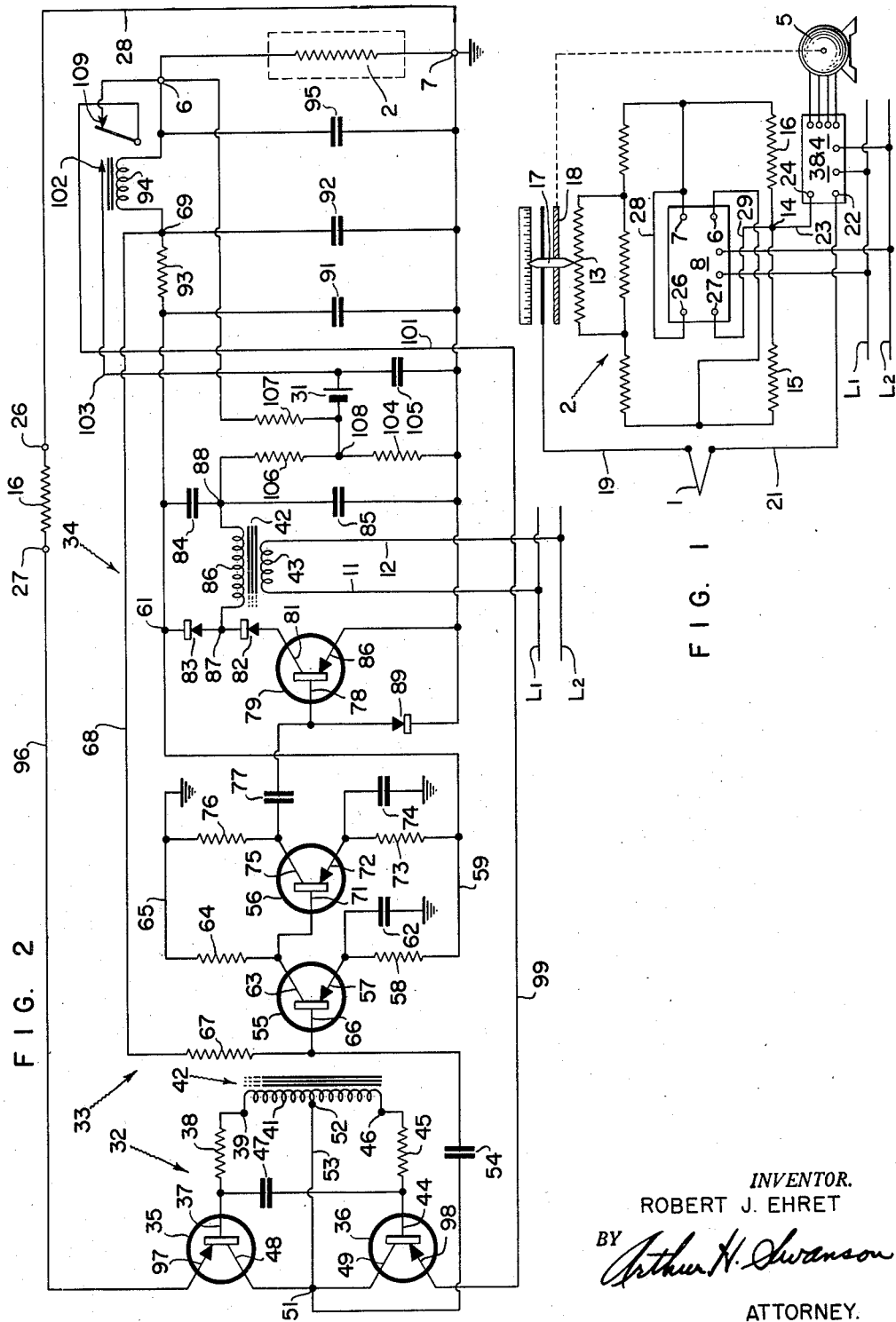

2,837,662

MEASURING AND CONTROL APPARATUS

Robert J. Ehret, Palo Alto, Calif., assignor to Minneapolis-Honeywell Regulator Company, Minneapolis, Minn., a corporation of Delaware Application September 29, 1955, Serial No. 537,526

15 Claims. (Cl. 307—88.5)

A general object of the present invention is to provide an improvement in measuring and control apparatus. More specifically, the present invention is concerned with a constant voltage supply. Such a circuit is useful for providing a continuously standardized voltage for the measuring circuit of a self-balancing potentiometer.

In the operation of self-balancing potentiometers, the voltage to be measured is bucked against a voltage derived from a measuring circuit. Any difference between these voltages is amplified by means of an electronic amplifier which is operative to impress upon a motor drive circuit a signal varying in magnitude and phase in accordance with the magnitude and direction of the difference voltage. The motor drive circuit, in turn, operates in accordance with the magnitude and phase of that signal to selectively energize a motor for rotation in a direction and to the extent necessary to adjust the measuring circuit so that the voltage derived therefrom is exactly equal and opposite in sense to the voltage being measured.

In order to achieve the high degree of accuracy potentially available with such a measuring system, it is necessary to insure that the potential energizing source of the measuring circuit is of a constant magnitude. Heretofore, it has been the general practice to energize the measuring circuit from a battery and from time to time to compensate for changes in the voltage of the battery by automatically or manually adjusting a resistor in series therewith to bring the measuring circuit voltage to the proper value. To accomplish this the voltage across a portion of the measuring circuit is compared to the voltage of a standard cell and standardized accordingly.

It is, therefore, a specific object of the present invention to provide a means whereby the voltage across a portion of a potentiometer measuring circuit is continuously compared and standardized to the voltage of a standard cell.

The general form of the present invention comprises a closed loop system, the output of which is used to energize the potentiometer measuring circuit. A portion of the measuring circuit voltage is compared to the voltage of a standard cell, any error being applied to the input of an amplifier. The error voltage is modulated to produce an A. C. signal whose phase and magnitude depends upon the direction and magnitude of the error voltage. This A. C. signal is amplified in the amplifier to control a rectifying phase discriminator. The direct current output of the phase discriminator is filtered and applied across the measuring circuit.

Another specific object of the present invention is to provide a new and improved phase discriminator which will provide a direct current output controllable in accordance with the magnitude and phase of an input signal thereto.

Still another specific object of the present invention is to provide a new and improved phase discriminator in which a transistor is employed in novel cooperation with a voltage doubler type circuit to provide a filtered direct current output.

A further object of the present invention is to utilize the properties of transistors to achieve a compact economical design which will permit the amplifier to be energized from the low voltage output of the phase discriminator.

A still further object of the present invention is to provide a temperature stable transistor voltage regulator which has a D. C. output which is comparatively unaffected by the variations in line voltage.

The various features of novelty which characterize this invention are pointed out with particularly in the claims annexed to and forming part of this specification. For a better understanding of the invention, its advantages, and the specific objects attained with its use, reference should be had to the accompanying drawings and descriptive matter in which are illustrated and described preferred embodiments of this invention.

Of the drawings:

Fig. 1 is a schematic diagram of the present invention employed to continuously standardize the voltage of a measuring circuit in a self-balancing potentiometer; and Fig. 2 is a circuit diagram of a preferred embodiment of the present invention as employed in Fig. 1.

Referring now to the drawings, Fig. 1 shows an embodiment of the present invention employed to standardize the energizing voltage of the measuring circuit of a self-balancing potentiometer. As shown, the self-balancing potentiometer is adapted for measuring the output of a thermocouple 1. In this apparatus, changes in the output of the thermocouple 1 unbalance a measuring circuit 2. This unbalance is amplified by means of an electronic amplifier 3 which is operative to impress upon the input of a motor drive circuit 4 a signal varying in magnitude and phase in accordance with the magnitude and direction of the unbalance. The motor drive circuit 4, in turn, operates selectively, in accordance with the phase and magnitude of the signal, to energize the rebalancing motor 5, driving in a direction and to the extent necessary to rebalance the measuring circuit 2.

The measuring circuit 2 comprises two resistive branch circuits connected in parallel across the output terminals 6 and 7 of a constant voltage source 8. As shown, the constant voltage source 8 is energized from a suitable source of alternating current, the conductors $L_1$ and $L_2$, by means of the conductors 11 and 12. One of the two resistive branch circuits includes a slidewire resistor 13 and the other resistive branch circuit includes the circuit point 14 between the resistors 15 and 16 connected in series with one another. A sliding contact 17 engages the slidewire 13 and is adjustable along the length of the latter by the rotation of an adjusting element 18.

The thermocouple 1 is connected by means of a conductor 19 to the sliding contact 17 and is connected by means of a conductor 21 to the input terminal 22 of an amplifier 3. The point 14 is connected by means of a conductor 23 to an input terminal 24 of the amplifier 3. The amplifier 3 is a D. C. conversion amplifier which is operative to convert into A. C. and amplify any D. C. unbalance signal appearing across its input terminals.

When the measuring apparatus of Fig. 1 is unbalanced by a change in the output voltage of the thermocouple 1, current is caused to flow in the circuit comprising the thermocouple 1, the conductor 21, the input of the amplifier 3, the conductor 23, and the bridge circuit connected between the slidewire contact 17 and the terminal point 14. When such unbalance occurs, the rebalancing motor 5 is energized for rotational operation and adjusts the slider contact 17 in the direction and to the extent necessary to restore the equality of the voltages of the thermocouple of the potential drop across the bridge circuit between the point 14 and the slidewire point engaged by the slider 17. While the apparatus is unbalanced, the direction of the flow of current through the thermocouple is in one direction or the other direction as the thermocouple voltage exceeds or is less than the voltage drop in the bridge circuit between the point 14 and the slider contact 17.

The constant voltage supply 8 functions as a closed loop system wherein its output voltage is continuously compared to the voltage of a standard cell and adjusted accordingly to maintain a constant value. To enable the constant voltage supply 8 to sample the voltage across the bridge circuit 2, the resistor 16 in the lower resistive branch circuit of the measuring circuit 2 is connected across the input terminals 26 and 27 of the constant voltage supply 8 by means of the conductors 28 and 29 respectively. The magnitude of the resistor 16 is selected with respect to the current flowing in the lower branch circuit of the measuring circuit so that the voltage drop across the resistor 16 is equal in magnitude to the voltage of the standard cell. Thus, if the voltage drop across the resistor 16 differs from the voltage of the standard cell, the output of the constant voltage supply 8 is adjusted so that the output will change or tend to be of the proper magnitude to restore the equality of voltages.

Referring now to Figure 2, there is shown a circuit diagram of the constant voltage source 8 of Figure 1. Any difference between the voltage drop across the resistor 16 and the voltage of a standard cell 31, is applied to the input of an amplifier 33. This error signal is modulated by a two transistor modulator 32 to give a 60 cycle signal whose phase and magnitude depend upon the phase and magnitude of the error. This A. C. signal is amplified in a two stage transistor amplifier 33 which controls a transistor phase discriminator 34. The phase discriminator 34 produces a D. C. output which is filtered and applied to the measuring circuit 2 which is shown here symbolically as a resistance.

The modulator 32 employs two pnp junction transistors 35 and 36 as switching elements. Each of these transistors has the usual emitter, collector, and base electrodes. The base 37 of the transistor 35 is connected through the resistor 38 to the end terminal 39 of the secondary winding 41 of a transformer 42. The transformer 42 has a primary winding 43, shown in the phase discriminator section of this figure, which is connected across the alternating current conductors L₁ and L₂. Similarly, the base 44 of the transistor 36 is connected through resistor 45 to the end terminal 46 of the secondary winding 41. The resistors 38 and 45 in the respective base electrodes of the transistors 35 and 36 work in conjunction with the base diodes of the transistors to give a square wave current in the bases and limit current flow. The capacitor 47 connected between the base 37 of the transistor 35 and the base 44 of the transistor 36 shifts the phase of the modulator output and compensates for phase shifts in the amplifier 33. The collector 48 of the transistor 35 and the collector 49 of the transistor 36 are connected together at the point 51 and to the center tap 52 of the secondary winding 41 by means of the conductor 53. As shown, the collectors 48 and 49 of the transistors 35 and 36 are connected to the input of the amplifier 33 by means of the coupling capacitor 54.

The amplifier 33 is a two stage transistor amplifier employing the transistors 55 and 56 as its amplifying elements. Emitter 57 of the transistor 55 is connected through a resistor 58 to a conductor 59 which in turn is connected to a point 61 in the phase discriminator 34. Thus, the transistor 55 obtains its emitter current from the point 61, the potential of which, like the output of the supply is regulated. The resistor 58 is bypassed to ground by means of a capacitor 62. Collector 63 of the transistor 55 is connected through a resistor 64 to a conductor 65 which is grounded. Base 66 of the transistor 55 is connected by means of a resistor 67 and a conductor 68 to a point 69 in the ouput of the phase discriminator circuit 34.

The collector 63 of the transistor 55 is direct coupled to the base 71 of the transistor 56. Emitter 72 of the transistor 56 is connected through a resistor 73 to the conductor 59. The resistor 73 is bypassed to ground by means of a capacitor 74. The collector 75 of the transistor 56 is connected through a resistor 76 to the grounded conductor 65. As shown, the collector 75 of the transistor 56 is coupled by means of a capacitor 77 to the base electrode 78 of the transistor 79 in the phase discriminator 34.

The phase discriminator 34 employs the transistor 79 as part of a voltage doubler type circuit. The collector 81 of the transistor 79 is connected through diodes 82 and 83 to point 61. The diodes 82 and 83 are poled to prevent the flow of current into the collector 81. The secondary winding 86 of the transformer 42 is connected between the junction 87 of the diodes 82 and 83 and the junction 88 of a pair of capacitors 84 and 85. A diode 89 is connected between the base 78 and the emitter 86 of the transistor 79.

The diodes 82 and 83, the transistor 79, and the capacitors 84 and 85, cooperate with the secondary winding 86 of the transformer 42 to form a voltage doubler type circuit. However, the rectifying action of the diode 82 and hence the charge on the condenser 85 is controlled by the transistor 79. A filter circuit comprising capacitors 91 and 92 and a resistor 93 is connected across the condensers 84 and 85 to filter the output of the phase discriminator 34. Additional filtering is obtained from the relay coil 94 and the capacitor 95 connected across the capacitor 92. The output of the circuit is across the condenser 95 and is indicated by the output terminals 6 and 7. As shown, the measuring circuit 2 is represented symbolically by the resistor connected across the output terminals 6 and 7.

Means for sampling the voltage across the measuring circuit 2 and applying that voltage to the input of the modulator 32 are provided in the input terminals 26 and 27 to which the resistor 16 of the bridge circuit 2 is connected. As shown, input terminal 26 is connected to the output terminal 7 by the conductor 28. The input terminal 27 is connected by a conductor 96 to the emitter 97 of the transistor 35 in the modulator circuit 32. In order that the input to the amplifier may see the difference between the voltage drop across the resistor 16 and the voltage of the standard cell or other reference voltage, one terminal of the standard cell 31 is connected to the point 108. The other terminal of the standard cell 31 is connected by means of a conductor 103, through the relay contacts 102, the conductor 101 and the conductor 99 to the emitter 98 of the transistor 36 in the modulator circuit. The capacitor 105 connected between the standard cell and ground and the resistance of the standard cell acts as a series lead network to improve the stability of the loop. It also makes the modulator less susceptible to the leakage current of the transistors.

A resistor 104 is connected to the circuit point 88 between the capacitors 84 and 85 by means of a resistor 106. The resistor 107 is connected between the junction 108 of the resistors 104 and 106 and the output terminal 6. As will be explained later, the resistors 104 and 107 cooperate to provide offset compensation for the regulator. The resistor 106 provides line voltage compensation in a manner which will also be explained hereinafter.

In considering the operation of the constant voltage supply of Fig. 2, the operation of the modulator circuit 32 is first considered. The modulator circuit 32 employs the pnp junction transistors 35 and 36 as switching elements. When the base of a pnp transistor is positive with respect to both the emitter and collector, the transistor will act as an open switch with very low leakage. When the base is negative with respect to both the emitter or collector, the transistor will act as a closed switch with a very low voltage drop. In this circuit, the transformer secondary winding 41 is employed to control the switching action of the transistors by applying between their respective base and collector electrodes an alternating reference voltage. When the end terminal 39 of the transformer secondary winding 41 is negative with respect to the center tap 52, the voltage drop across the resistor 16, connected between the emitter 97 and ground, is applied, through the low impedance of the emitter-collector circuit of the transistor 35, across the capacitor 54 and the input to the amplifier 33. Similarly, when the end terminal 46 of the secondary winding 41 is negative with respect to the center tap 52, the voltage of the standard cell 31 and the voltage drop across the resistor 104 is applied, through the low impedance of the emitter-collector circuit of the transistor 36, across the capacitor 54 and the input of the amplifier 33. Thus, the modulator circuit 32 in cooperation with the capacitor 54 applies to the input of the amplifier 33 an alternating current signal varying in magnitude and phase in accordance with the magnitude and direction of the difference between the voltage drop across the resistor 16 and the voltage of the standard cell plus the voltage drop across the resistor 104. The voltage drop across the resistor 104 supplies a zero offset input signal which, because of the finite gain of the system, aids in establishing the level of output voltage. It should be noted that the standard cell 31 could be connected in a bucking relationship to the voltage drop across the resistor 16 in the emitter circuit of the transistor 35 if desired. However, with the standard cell connected as shown the modulator sees a more balanced load, improving the over-all circuit operation.

The alternating error signal of the modulator 32 is amplified in the amplifier 33 and applied to the input of the transistor 79 to control the operation of the phase discriminator circuit 34. The phase discriminator 34 may be thought of as a controlled voltage doubler in that the diodes 82 and 83, the capacitors 84 and 85, and the transformer secondary winding 86 without the transistor 79 form a conventional voltage doubler circuit. The transistor 79 controls the magnitude of the voltage contributed by the diode 82 to the output voltage. Thus, the total output voltage from the circuit can be considered to comprise a fixed voltage contributed by the rectifying action of the diode 83 and filtered by the capacitor 84 and a controlled voltage contributed by the diode 82, as controlled by the transistor 79, and filtered by the capacitor 85.

During the half cycle in which the voltage across the secondary winding 86 is such as to make the point 87 positive with respect to the point 88, current will flow through the diode 83 and the capacitor 84 to the point 88 charging the capacitor 84. During this same half cycle the diode 82 which serves to rectify the voltage from the secondary winding 86 during the next half cycle serves to prevent the flow of current through the collector base circuit of the transistor 79.

During the next half cycle when the point 88 is positive with respect to the point 87, current will flow to the capacitor 85 and the diode 82 and charge the capacitor 85 depending upon the conductivity of the emitter-collector circuit of the transistor 79 as controlled by the signal applied to the emitter-base circuit of that transistor by the output of the amplifier 32. If, during this half cycle, the signal applied on the base of the transistor 79 from the output of the amplifier 33 is such as to make the base positive with respect to the emitter 86, that signal will be shunted to ground by the diode 89 and the transistor will be non-conductive. If, however, the signal applied to the base 78 of the transistor 79 is such as to make the base negative with respect to the emitter 86, base current will flow in the transistor 78 and the emitter-collector circuit of the transistor will be rendered conductive in proportion to the magnitude of that signal.

The voltage appearing across the capacitors 84 and 85 receives additional filtering from the capacitors 91, 92, and 95 working in cooperation with the resistor 93 and the inductance of the relay coil 94. This voltage appears across the output terminals 6 and 7 and hence across the measuring circuit 2. The phasing of the modulator control voltage, appearing across the secondary winding 41 of the transformer 42, is phased with reference to the phase discriminator control voltage, appearing across the secondary winding 86 of the transformer 42, in such a manner that upon a decrease of the circuit output voltage, the contribution to the output voltage by the diode 82 and the capacitor 85 is increased and conversely when the output voltage is too high the contribution to that voltage by the diode 82 and the capacitor 85 is reduced.

As mentioned before, the resistor 104 supplies a zero offset input signal which aids in establishing the output voltage level. This voltage is developed across the resistor 104 due to the current flow through the resistor 107 which is connected to the output terminal 6. Additional line voltage compensation is achieved by the resistor 106 which is connected between the resistor 104 and the circuit point 88. Since the voltage on the circuit point 88 will be more positive for low line voltages and more negative for high line voltages, it will aid in reducing line voltage errors of the amplifier. With the configuration shown, the constant voltage supply will maintain a fixed output voltage at accuracies better than 0.01 percent against line voltage variations as high as plus or minus 15 percent.

The switch blade and the contact 102 of the relay 94 connect the standard cell 31 to the circuit point 108. The relay 94 is provided to disconnect the standard cell from the circuit when the latter is not in operation. In order that the standard cell will be immediately connected into the circuit when the latter is energized, the back contact of the relay 94 is connected to the output terminal 6 to provide a positive input signal to the amplifier which will cause sufficient current to flow through the relay coil 94 to energize the same. When energized, the relay 94 reconnects the standard cell 31 to the operating point 108.

Certain other features of this constant voltage supply are of interest. Because the subject circuit has been designed to supply a relatively low voltage it was found desirable to employ transistors as the switching and amplifying elements. For example, by employing transistors as the amplifying elements in the amplifier 33 it is possible to energize the amplifier 33 from the low voltage output of the phase discriminator circuit. In addition, since this constant voltage supply functions as a closed loop system, it is inherently temperature stable and relatively free of temperature effects and changing transistor properties providing the transistors employed have a high gain and a low $I_{co}$.

While the subject circuit has been shown, employed to continuously standardize the voltage across a bridge circuit, it should be understood that it will function equally well for providing a constant voltage for other types of loads. In this connection it should also be understood that with the appropriate change in circuit components that output voltages higher than those required of a measuring circuit in a self-balancing potentiometer can be obtained.

While, in accordance with the provisions of the statutes, there has been illustrated and described the best form of the embodiments of the invention now known, it will be apparent to those skilled in the art that changes may be made in the form of the apparatus disclosed without departing from the spirit of the invention as set forth in the appended claims and that in some instances certain features of the invention may be used to advantage without a corresponding use of other features.

Having now described this invention, what is claimed as new and for which it is desired to secure by Letters Patent is:

1. In combination, a transistor having an emitter, a a collector, and a base, a pair of diodes connected in series with the collector of said transistor, a source of alternating current and a first capacitor connected in series between the junction of said diodes and the emitter of said transistor and hence across one of said diodes and said transistor, a second capacitor connected across said alternating current source and the other of said diodes, and an input circuit connected to the base and emitter of said transistor.

2. In combination, a transistor having an emitter, a collector, and a base, a first diode, a source of alternating current, and a first capacitor connected in series with the collector-emitter circuit of said transistor, said first diode being poled so as to prevent current flow into the collector of said transistor, a second diode and a second capacitor connected in series across said alternating current source, said second diode being poled in the same direction with respect to the transistor collector as the first diode, and a third diode connected between the emitter and base of said transistor, said third diode being poled to conduct current away from said base and toward said emitter.

3. In combination, a voltage doubler circuit comprising a pair of series connected diodes and a pair of series connected capacitors having their junctions connected across a source of alternating current as a voltage doubler, a transistor having an emitter, a collector, and a base, the emitter-collector circuit of said transistor being connected in series with and between one of said diodes and one of said capacitors, and a third diode connected between the base and emitter of said transistor and poled to pass current away from said base.

4. In combination, a direct current to alternating current converter, an amplifier circuit means connecting the output of said converter to the input of said amplifier, a phase discriminator comprising a transistor having an emitter, a collector, and a base, a pair of diodes connected in series with the collector of said transistor, a source of alternating current and a first capacitor connected in series between the junction of said diodes and the emitter of said transistor and hence across one of said diodes and said transistor, a second capacitor connected across said alternating current source and the other of said diodes, and an input circuit connected to the base and emitter of said transistor, circuit means connecting the output of said amplifier to the emitter-base circuit of said transistor, a load circuit connected across said first and said second capacitors, a first circuit including a standard cell connecting the load circuit with said converter, and a second circuit including load circuit voltage sampling means connecting the load circuit with said converter.

5. A voltage regulating circuit comprising in combination direct current to alternating current conversion means comprising a pair of transistors each having an emitter, a collector, and a base, and a center tapped transformer secondary adapted to be energized with a reference voltage, the base of one of said transistors being connected to one end terminal of said secondary winding, the base of the other transistor being connected to the other end terminal of said winding, the collectors of both of said transistors being connected to the center tap of said winding, an amplifier, circuit means connecting the output of said conversion means to the input of the amplifier, a rectifying phase discriminator comprising in combination a transistor having an emitter, a collector, and a base, a first diode, a source of alternating current, and a first capacitor connected in series with the collector-emitter circuit of said transistor, said first diode being poled so as to prevent current flow into the collector of said transistor, a second diode and a second capacitor connected in series across said alternating current source, said second diode being poled in the same direction with respect to the transistor collector as the first diode, and a third diode connected between the emitter and base of said transistor, said third diode being poled to pass current away from said base and toward said emitter, circuit means connecting the output of said amplifier to the emitter-base circuit of said transistor, a filter circuit connected across said first and second capacitors, a voltage divider connected across the output of said filter, circuit means including a standard cell connecting a point on said voltage divider to the emitter of one of the two transistors in the conversion means, a load connected across the output of said filter, and load voltage sampling means connecting said load to the emitter of the other transistor in the conversion means.

6. Apparatus as specified in claim 5 wherein circuit means connect the junction of said alternating current source and said first and second capacitors to the point on said voltage divider to which the standard cell is connected to provide additional line voltage compensation.

7. Apparatus as specified in claim 5 wherein a relay is connected in series with the load across the output of said filter, the contacts of said relay being employed to disconnect said standard cell from said voltage divider when the circuit is deenergized.

8. Apparatus as specified in claim 6 wherein a back contact on said relay connects said standard cell to a circuit point which will be of such a polarity upon circuit energization as to provide an input signal to said amplifier such as to cause instantaneous relay energization.

9. A phase discriminator comprising a transistor having an emitter, a collector, and a base, a pair of diodes connected in series with the collector of said transistor and poled to prevent current flow into said collector, a source of alternating current and a first capacitor connected in series between the junction of said diodes and the emitter of said transistor and hence across one of said diodes and said transistor, the junction of said first capacitor and said alternating current source being one output terminal of said circuit, a second capacitor connected across said alternating current source and the other of said diodes, the junction of said second capacitor and said other diode being a second output terminal of said circuit, a diode connected between the base and emitter of the transistor and poled for forward conduction in the direction of the emitter, and filtering means connected between the second of said output terminals and the emitter of said transistor.

10. Means for continuously standardizing a bridge circuit wherein the potential drop across a portion of the bridge is compared to the potential of a standard source comprising, direct current to alternating current conversion means, amplifying means, circuit means connecting the output of said conversion means to the input of said amplifier, phase discriminating means comprising a transistor having an emitter, a collector, and a base, a pair of diodes connected in series with the collector of said transistor and poled to prevent current flow into said collector, a source of alternating current and a first capacitor connected in series between the junction of said diodes and the emitter of said transistor and hence across one of said diodes and said transistor, the junction of said first capacitor and said alternating current source being one output terminal of said circuit, a second capacitor connected across said alternating current source and the other of said diodes, the junction of said second capacitor and said other diode being a second output terminal of said circuit, a diode connected between the base and the emitter of the transistor and poled for forward conduction in the direction of the emitter, and filtering means connected between the second of said output terminals and the emitter of said transistor, circuit means connecting the output of said amplifier to the input of said phase discriminating means, circuit means connecting the bridge circuit across said filtering means, circuit connecting a portion of said bridge circuit for voltage sampling purposes to the input of said amplifier and circuit means including a standard potential source connecting said first phase discriminator output to the input of said amplifier.

11. A voltage regulating circuit comprising in combination direct current to alternating current conversion means comprising a pair of transistors each having an emitter, a collector, and a base, and a center tapped transformer secondary adapted to be energized with a reference voltage, the base of one of said transistors being connected to one end terminal of said secondary winding, the base of the other transistor being connected to the other end terminal of said winding, the collectors of both of said transistors being connected to the center tap of said winding, an amplifier and a phase discriminating circuit connected across the output of said conversion means, a load circuit connected across the output of said phase discriminating circuit, a load voltage sampling circuit connected between the load circuit and the emitter of one of the transistors in the conversion means, and circuit means including a standard voltage source connected to the emitter of the other transistor in the conversion means.

12. Apparatus as specified in claim 8 wherein circuit means connect the second of said phase discriminator terminals to the amplifier in an energizing relationship.

13. A phase discriminator comprising a transistor having an emitter, a collector, and a base, a pair of diodes connected in series with the collector of said transistor and poled to prevent current flow into said collector, a first and a second capacitor connected in series across said pair of diodes and the emitter collector circuit of said transistor, a source of alternating current connected between the junction of said diodes and the junction of said capacitors, circuit means connecting the output of said amplifier to the emitter-base circuit of said transistor and including a diode poled for forward conduction in the direction of the emitter.

14. In combination, an amplifier, phase discriminating means connected to the output of said amplifier, said phase discriminating means comprising, a transistor having an emitter, a collector, and a base, a pair of diodes connected in series with the collector of said transistor and poled to prevent current flow into said collector, a first and a second capacitor connected in series across said pair of diodes and the emitter-collector circuit of said transistor, a source of alternating-current connected between the junction of said diodes and the junction of said capacitors, circuit means connecting the output of said amplifier to the emitter-base circuit of said transistor and including a diode poled for forward conduction in the direction of the emitter, a load circuit connecting across said first and second capacitors, and load circuit voltage comparing circuit including alternating current to direct current conversion means and a standard voltage connecting the load circuit to the input of the amplifier.

15. Means for continuously standardizing a load voltage wherein a sample of that voltage is compared to a standard voltage source comprising direct current to alternating current conversion means comprising a pair of transistors each having an emitter, a collector, and a base, and a center tapper transformer secondary adapted to be energized with a reference voltage, the base of one of said transistors being connected to one end terminal of said secondary winding, the base of the other transistor being connected to the other end terminal of said winding, the collectors of both of said transistors being connected to the center tap of said winding, a transistor amplifier, circuit means connecting the output of said conversion means to the input of said amplifier, a phase discriminator connected to the output of said amplifier, said phase discriminator comprising a transistor having an emitter, a collector, and a base, a pair of diodes connected in series with the collector of said transistor and poled to prevent current flow into said collector, a first and a second capacitor connected in series across said pair of diodes and the emitter-collector circuit of said transistor, a source of alternating current connected between the junction of said diodes and the junction of said capacitors, circuit means connecting the output of said amplifier to the emitter-base circuit of said transistor and including a diode poled for forward conduction in the direction of the emitter, a load circuit connected across said first and second capacitors, a voltage divider connected between said alternating current source and said transistor emitter, circuit means connecting the load circuit with said voltage divider to aid in load voltage regulation, circuit means including a direct current to alternating current converter, a standard cell, and a load voltage sampling means connecting said load circuit to the input of said amplifier.

References Cited in the file of this patent

UNITED STATES PATENTS

| 2,695,381 | Darling | Nov. 23, 1954 |
| 2,698,392 | Herman | Dec. 28, 1954 |

FOREIGN PATENTS

| 660,192 | Great Britain | Oct. 31, 1951 |

OTHER REFERENCES

"Transistor Regenerative Amplifier as a Computer Element," by G. B. B. Chaplin, Proc. of the I. E. E., vol. 101, part III, No. 73, September 1954.